United States Patent
Lee et al.

(10) Patent No.: US 9,166,846 B1
(45) Date of Patent: Oct. 20, 2015

(54) EYE DIAGRAM CONSTRUCTION DISPLAY APPARATUS

(71) Applicant: Phytrex Technology Corporation, Taipei (TW)

(72) Inventors: Chih-Wei Lee, Taipei (TW); Chin-Fen Cheng, Taipei (TW); Te-Sheng Wang, Taipei (TW); Ta-Jen Kao, Taipei (TW)

(73) Assignee: PHYTREX TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 14/497,564

(22) Filed: Sep. 26, 2014

(51) Int. Cl.
*H04L 27/01* (2006.01)

(52) U.S. Cl.
CPC ...................................... *H04L 27/01* (2013.01)

(58) Field of Classification Search
CPC .............. H04B 1/16–1/302; H04B 1/10–1/14; H04B 1/1027–1/126; H04B 25/08
See application file for complete search history.

(56) References Cited

U.S. PATENT DOCUMENTS

| | | | |
|---|---|---|---|
| 6,584,163 B1 | 6/2003 | Myers, Jr. et al. | |
| 7,492,818 B2 * | 2/2009 | Markman et al. | 375/233 |
| 8,406,285 B1 | 3/2013 | Diukman | |
| 8,917,803 B1 * | 12/2014 | Asuncion et al. | 375/354 |
| 2009/0316772 A1 * | 12/2009 | Hidaka | 375/233 |
| 2010/0329325 A1 * | 12/2010 | Mobin et al. | 375/232 |
| 2014/0269890 A1 * | 9/2014 | Hoang et al. | 375/233 |

OTHER PUBLICATIONS

Office Action dated Aug. 3, 2015 of the corresponding Taiwan patent application.

* cited by examiner

*Primary Examiner* — Dac Ha
(74) *Attorney, Agent, or Firm* — Chun-Ming Shih; HDLS IPR Services

(57) ABSTRACT

An eye diagram construction display apparatus includes an amplifier, a first equalizer, an addition unit, a second equalizer, a bit error rate check unit, a clock recovery unit, a clock synthesizer, a processing unit and a display unit. The first equalizer is electrically connected to the amplifier. The addition unit is electrically connected to the first equalizer. The second equalizer is electrically connected to the addition unit. The bit error rate check unit is electrically connected to the addition unit. The clock recovery unit is electrically connected to the addition unit and the bit error rate check unit. The clock synthesizer is electrically connected to the clock recovery unit. The processing unit is electrically connected to the addition unit, the bit error rate check unit and the clock recovery unit. The display unit is electrically connected to the processing unit.

10 Claims, 3 Drawing Sheets

EYE DIAGRAM CONSTRUCTION DISPLAY APPARATUS

BACKGROUND OF THE INVENTION

1. Field of the Invention

The present invention relates to a display apparatus, and especially relates to an eye diagram construction display apparatus.

2. Description of the Related Art

A chip (for example, an integrated circuit) is one of the most import hardware of modern electronic devices. For different chips to interchange information (including data, messages and commands, etc.), a chip includes a transmitter circuit and a receiver circuit. The transmitter circuit of one chip transmits information to the receiver circuit of another chip.

As the receiver circuit receives the signal, the receiver circuit retrieves the information from the received signal. For examples, Ethernet network, optical fiber network, XAUI (10 Gigabit Media Independent Interface), PCI-E (Peripheral Component Interconnect Express) and SATA (Serial Advanced Technology Attachment) are commonly interface standards of modern high-speed chips.

To ensure that receiver circuit can correctly retrieve information from the received signal, monitoring the eye diagram of the signal received by the receiver circuit is very useful. Therefore, correctly monitoring the eye diagram of the signal received by the receiver circuit has become a key point of modern chip design. However, currently the related art eye diagram construction display apparatus has the disadvantages of complicated design and very high cost.

SUMMARY OF THE INVENTION

In order to solve the above-mentioned problems, an object of the present invention is to provide an eye diagram construction display apparatus.

In order to achieve the object of the present invention mentioned above, the eye diagram construction display apparatus is applied to a data stream. The eye diagram construction display apparatus comprises an amplifier, a first equalizer, an addition unit, a second equalizer, a bit error rate check unit, a clock recovery unit, a clock synthesizer, a processing unit and a display unit. The amplifier receives the data stream. The first equalizer is electrically connected to the amplifier. The addition unit is electrically connected to the first equalizer. The second equalizer is electrically connected to the addition unit. The bit error rate check unit is electrically connected to the addition unit. The clock recovery unit is electrically connected to the addition unit and the bit error rate check unit. The clock synthesizer is electrically connected to the clock recovery unit. The processing unit is electrically connected to the addition unit, the bit error rate check unit and the clock recovery unit. The display unit is electrically connected to the processing unit.

Moreover, the amplifier is, for example but not limited to, a variable gain amplifier. The first equalizer is, for example but not limited to, a feed forward equalizer. The second equalizer is, for example but not limited to, a decision feedback equalizer. The addition unit is, for example but not limited to, an adder. The bit error rate check unit is, for example but not limited to, a bit error rate check circuit. The clock recovery unit is, for example but not limited to, a clock recovery circuit. The display unit is, for example but not limited to, a display. The processing unit is, for example but not limited to, a microprocessor or a microcontroller.

The eye diagram construction display apparatus has the advantages of simple design and low cost.

DETAILED DESCRIPTION OF THE INVENTION

Figure 1:
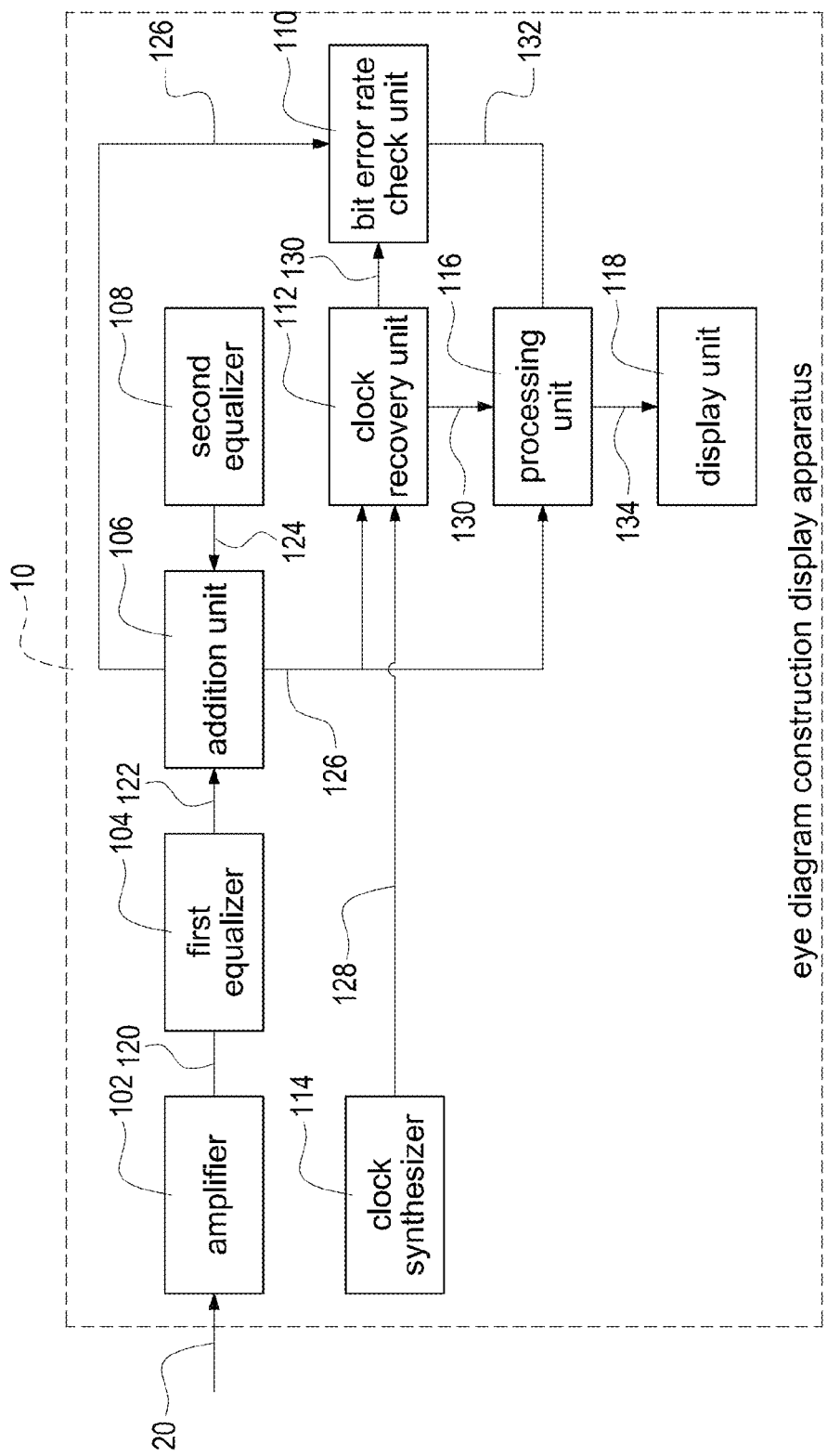
FIG. 1 shows a block diagram of the eye diagram construction display apparatus of the present invention.

FIG. 1 shows a block diagram of the eye diagram construction display apparatus of the present invention. An eye diagram construction display apparatus 10 is applied to a data stream 20. The eye diagram construction display apparatus 10 comprises an amplifier 102, a first equalizer 104, an addition unit 106, a second equalizer 108, a bit error rate check unit 110, a clock recovery unit 112, a clock synthesizer 114, a processing unit 116 and a display unit 118.

The amplifier 102 receives the data stream 20. The first equalizer 104 is electrically connected to the amplifier 102. The addition unit 106 is electrically connected to the first equalizer 104. The second equalizer 108 is electrically connected to the addition unit 106. The bit error rate check unit 110 is electrically connected to the addition unit 106.

The clock recovery unit 112 is electrically connected to the addition unit 106 and the bit error rate check unit 110. The clock synthesizer 114 is electrically connected to the clock recovery unit 112. The processing unit 116 is electrically connected to the addition unit 106, the bit error rate check unit 110 and the clock recovery unit 112. The display unit 118 is electrically connected to the processing unit 116.

The amplifier 102 is, for example but not limited to, a variable gain amplifier. The first equalizer 104 is, for example but not limited to, a feed forward equalizer. The second equalizer 108 is, for example but not limited to, a decision feedback equalizer. The addition 106 unit is, for example but not limited to, an adder.

The bit error rate check unit 110 is, for example but not limited to, a bit error rate check circuit. The clock recovery unit 112 is, for example but not limited to, a clock recovery circuit. The display unit 118 is, for example but not limited to, a display. The processing unit 116 is, for example but not limited to, a microprocessor or a microcontroller.

The amplifier 102 amplifies the data stream 20 with a variable gain pattern to obtain an amplified data stream 120 after the amplifier 102 receives the data stream 20. The amplifier 102 sends the amplified data stream 120 to the first equalizer 104.

The first equalizer 104 processes the amplified data stream 120 to obtain a first equalization signal 122 after the first equalizer 104 receives the amplified data stream 120. The first equalizer 104 sends the first equalization signal 122 to the addition unit 106.

The second equalizer 108 sends a second equalization signal 124 to the addition unit 106. The addition unit 106 adds the first equalization signal 122 to the second equalization signal 124 to obtain a totaling equalization signal 126 after the addition unit 106 receives the first equalization signal 122 and the second equalization signal 124. The addition unit 106 sends the totaling equalization signal 126 to the bit error rate check unit 110, the clock recovery unit 112 and the processing unit 116.

The clock synthesizer 114 sends a clock synthesis signal 128 to the clock recovery unit 112. The clock recovery unit 112 generates a clock recovery signal 130 after the clock recovery unit 112 receives the totaling equalization signal 126 and the clock synthesis signal 128. The clock recovery unit 112 sends the clock recovery signal 130 to the bit error rate check unit 110 and the processing unit 116.

The bit error rate check unit 110 checks a bit error rate of the totaling equalization signal 126 to obtain a bit error rate signal 132 after the bit error rate check unit 110 receives the totaling equalization signal 126 and the clock recovery signal 130. The bit error rate check unit 110 sends the bit error rate signal 132 to the processing unit 116.

Figure 2:
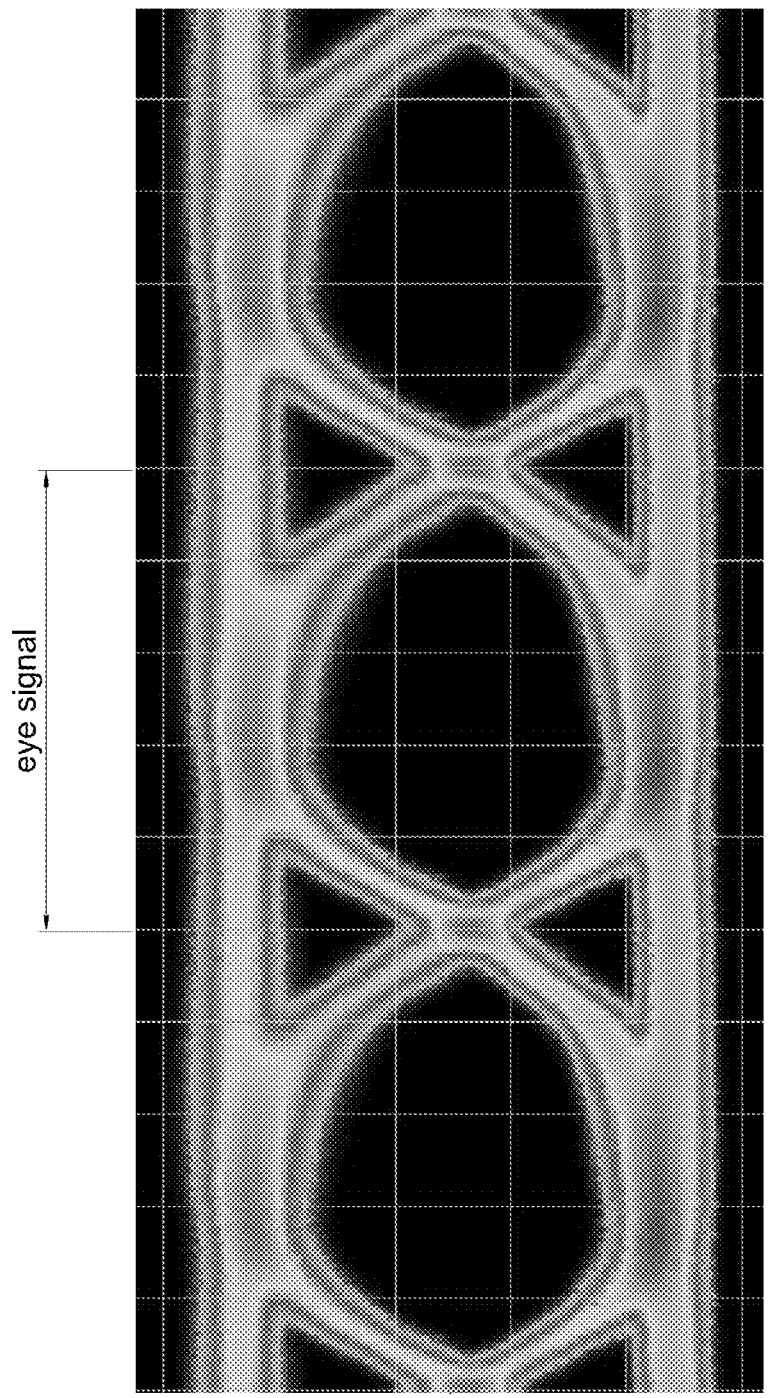
FIG. 2 shows a diagram of a part of an embodiment of the eye serial signal of the present invention.

The processing unit 116 is configured to process the totaling equalization signal 126, the clock recovery signal 130 and the bit error rate signal 132 to obtain an eye serial signal after the processing unit 116 receives the totaling equalization signal 126, the clock recovery signal 130 and the bit error rate signal 132. The eye serial signal comprises a plurality of eye signals. FIG. 2 shows a diagram of a part of an embodiment of the eye serial signal of the present invention.

The processing unit 116 fetches a middle eye signal of the eye serial signal and fetches two of a half of the eye signal at both sides of the middle eye signal to obtain an eye diagram signal 134. The processing unit 116 is configured to process the eye diagram signal 134 with histogram scanning, bilinear interpolation and bicubic interpolation. The processing unit 116 amplifies the eye diagram signal 134. The processing unit 116 sends the eye diagram signal 134 to the display unit 118.

Figure 3:
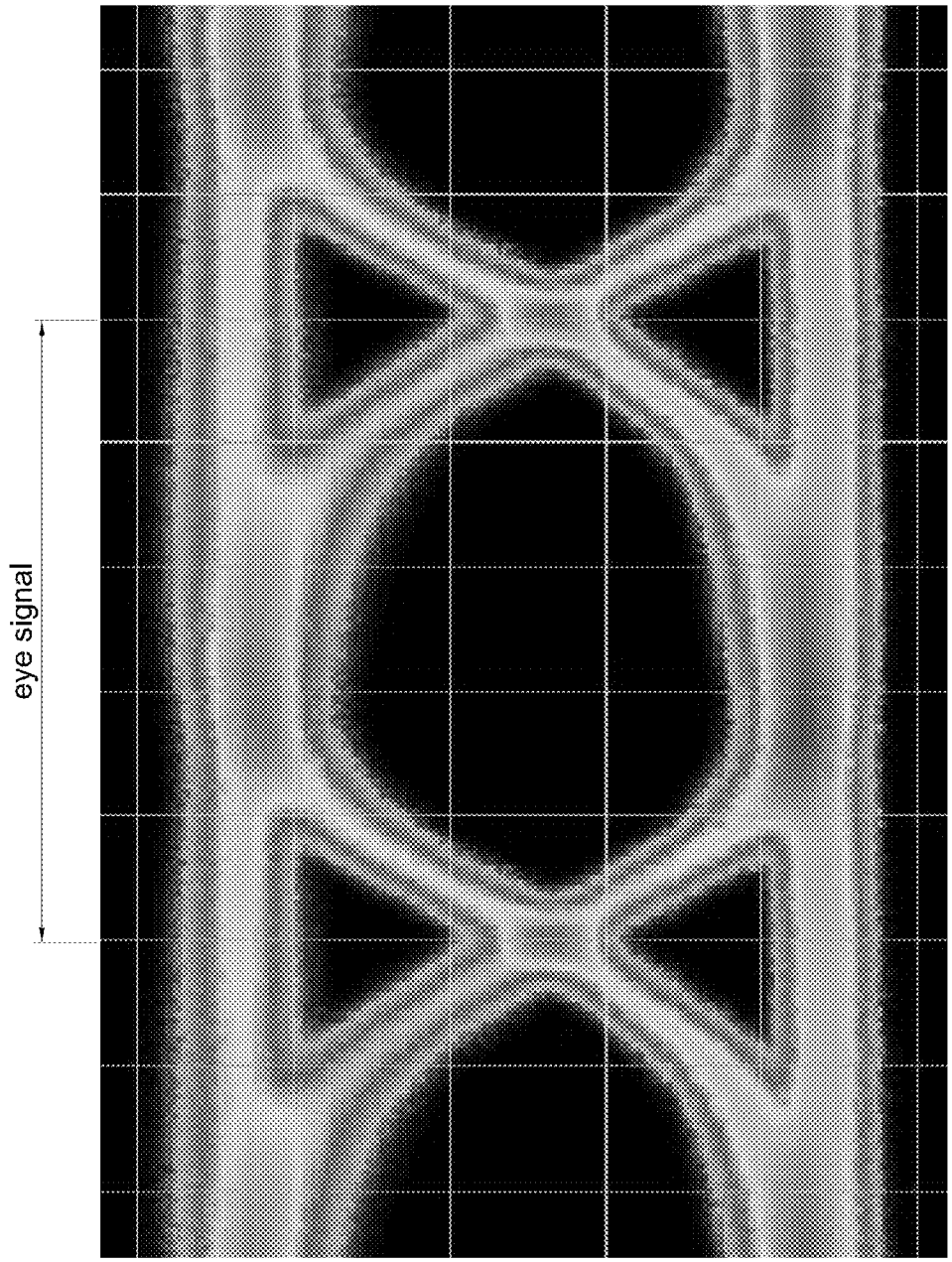
FIG. 3 shows a diagram of an embodiment of the eye diagram signal of the present invention.

The display unit 118 displays a content of the eye diagram signal 134 after the display unit 118 receives the eye diagram signal 134. FIG. 3 shows a diagram of an embodiment of the eye diagram signal of the present invention.

The eye diagram construction display apparatus has the advantages of simple design and low cost.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An eye diagram construction display apparatus applied to a data stream, the eye diagram construction display apparatus comprising:
   an amplifier receiving the data stream;
   a first equalizer electrically connected to the amplifier;
   an addition unit electrically connected to the first equalizer;
   a second equalizer electrically connected to the addition unit;
   a bit error rate check unit electrically connected to the addition unit;
   a clock recovery unit electrically connected to the addition unit and the bit error rate check unit;
   a clock synthesizer electrically connected to the clock recovery unit;
   a processing unit electrically connected to the addition unit, the bit error rate check unit and the clock recovery unit; and
   a display unit electrically connected to the processing unit, wherein the amplifier amplifies the data stream with a variable gain pattern to obtain an amplified data stream after the amplifier receives the data stream; the amplifier sends the amplified data stream to the first equalizer; the first equalizer processes the amplified data stream to obtain a first equalization signal after the first equalizer receives the amplified data stream; the first equalizer sends the first equalization signal to the addition unit; the second equalizer sends a second equalization signal to the addition unit; the addition unit adds the first equalization signal to the second equalization signal to obtain a totaling equalization signal after the addition unit receives the first equalization signal and the second equalization signal; the addition unit sends the totaling equalization signal to the bit error rate check unit, the clock recovery unit and the processing unit; the clock synthesizer sends a clock synthesis signal to the clock recovery unit; the clock recovery unit generates a clock recovery signal after the clock recovery unit receives the totaling equalization signal and the clock synthesis signal; the clock recovery unit sends the clock recovery signal to the bit error rate check unit and the processing unit; the bit error rate check unit checks a bit error rate of the totaling equalization signal to obtain a bit error rate signal after the bit error rate check unit receives the totaling equalization signal and the clock recovery signal; the bit error rate check unit sends the bit error rate signal to the processing unit; the processing unit is configured to process the totaling equalization signal, the clock recovery signal and the bit error rate signal to obtain an eye serial signal after the processing unit receives the totaling equalization signal, the clock recovery signal and the bit error rate signal; the eye serial signal comprises a plurality of eye signals; the processing unit fetches a middle eye signal of the eye serial signal and fetches two of a half of the eye signal at both sides of the middle eye signal to obtain an eye diagram signal; the processing unit is configured to process the eye diagram signal with histogram scanning, bilinear interpolation and bicubic interpolation; the processing unit amplifies the eye diagram signal; the processing unit sends the eye diagram signal to the display unit; the display unit displays a content of the eye diagram signal after the display unit receives the eye diagram signal.

2. The eye diagram construction display apparatus in claim 1, wherein the amplifier is a variable gain amplifier.

3. The eye diagram construction display apparatus in claim 2, wherein the first equalizer is a feed forward equalizer.

4. The eye diagram construction display apparatus in claim 3, wherein the second equalizer is a decision feedback equalizer.

5. The eye diagram construction display apparatus in claim 4, wherein the addition unit is an adder.

6. The eye diagram construction display apparatus in claim 5, wherein the bit error rate check unit is a bit error rate check circuit.

7. The eye diagram construction display apparatus in claim 6, wherein the clock recovery unit is a clock recovery circuit.

8. The eye diagram construction display apparatus in claim 7, wherein the display unit is a display.

9. The eye diagram construction display apparatus in claim 8, wherein the processing unit is a microprocessor.

10. The eye diagram construction display apparatus in claim 8, wherein the processing unit is a microcontroller.

* * * * *